United States Patent [19]
Cater et al.

[11] Patent Number: 5,839,617
[45] Date of Patent: Nov. 24, 1998

[54] PUMP DISPENSER

[75] Inventors: Miro S. Cater, Daytona Beach, Fla.; Earnest E. Bliss, III, Perrysburg, Ohio

[73] Assignee: Owens-Illinois Closure Inc., Toledo, Ohio

[21] Appl. No.: 902,027

[22] Filed: Jul. 29, 1997

[51] Int. Cl.[6] .................................................. G01F 11/04
[52] U.S. Cl. ................................................................ 222/321.9
[58] Field of Search .......................... 222/321.7, 321.9, 222/382, 383.1, 385

[56] References Cited

U.S. PATENT DOCUMENTS

| | | |
|---|---|---|
| 3,248,022 | 4/1966 | Schulman et al. ............... 222/321.9 |
| 3,627,206 | 12/1971 | Borris . |
| 4,503,997 | 3/1985 | Corsette ............................ 222/321.9 |
| 4,923,094 | 5/1990 | O'Neill . |
| 5,156,304 | 10/1992 | Battegazzore . |
| 5,163,588 | 11/1992 | Cater . |
| 5,261,573 | 11/1993 | Jouillat et al. . |
| 5,284,276 | 2/1994 | Cater . |
| 5,348,189 | 9/1994 | Cater . |
| 5,423,459 | 6/1995 | Cater . |
| 5,458,289 | 10/1995 | Cater . |

*Primary Examiner*—Philippe Derakshani

[57] ABSTRACT

Lotion pump has a stepped piston telescoping inside a stepped body to define a pumping chamber. The piston has in the wall of the piston inlet and discharge apertures, one above the other, to the pumping chamber. A stem integral with the actuator spout has a sealing head inside the piston which shuttles back and forth between positions at which it covers one aperture or the other. Shuttling is implemented by lost-motion between the actuator spout/stem and piston. A spring urges the stem up at all times.

16 Claims, 5 Drawing Sheets

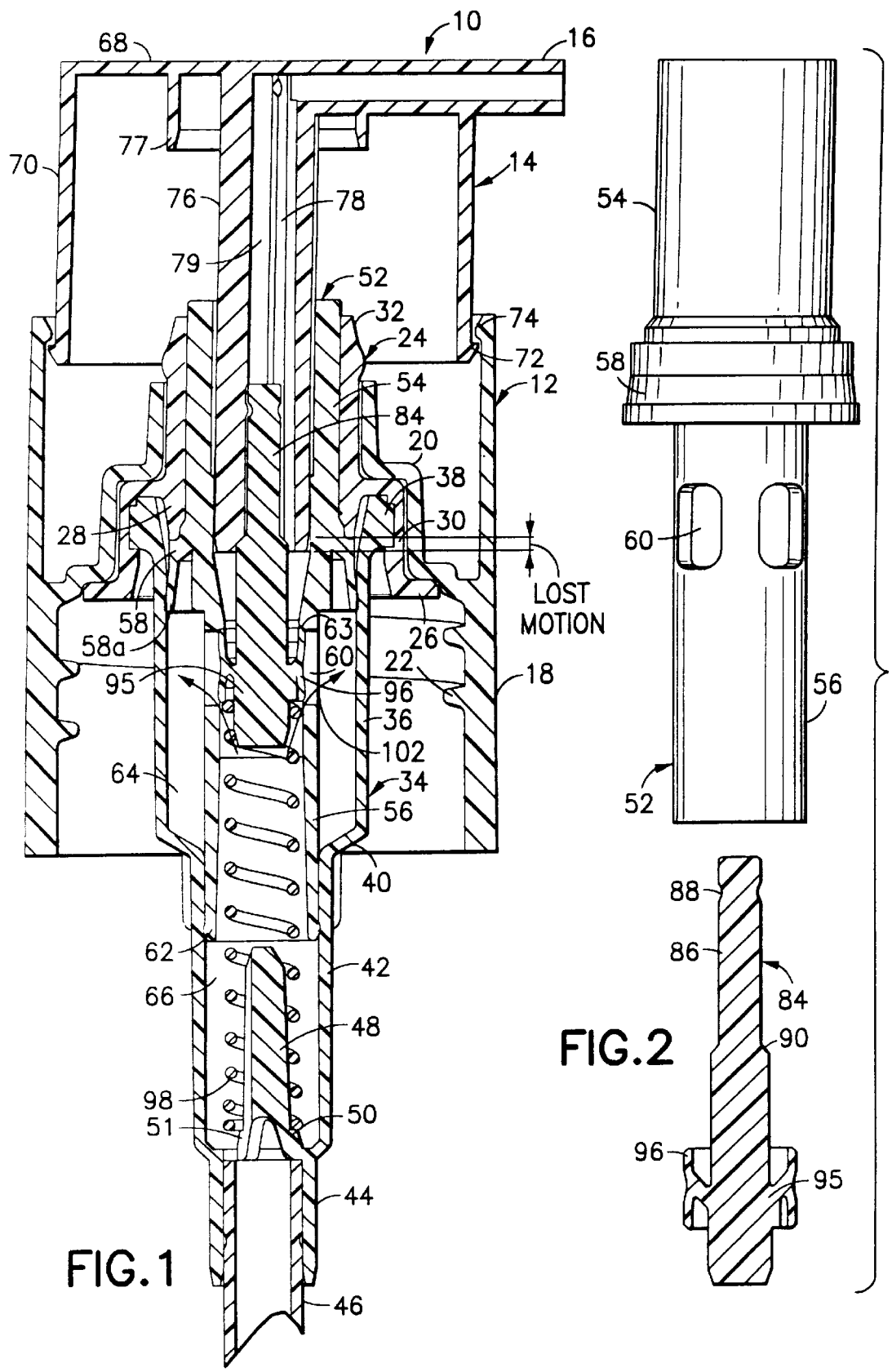

PUMP DISPENSER

FIELD OF THE INVENTION

This invention relates to a pump dispenser especially suitable as a dispenser of lotions and other creamy liquids. It includes an axial shuttle valve operated by an actuator and taking the place of the usual inlet and outlet check valves.

BACKGROUND OF THE INVENTION

U.S. Pat. No. 3,627,206 to Michel Boris discloses a pump having a central rod with spaced radial passages communicating respectively with axial discharge and inlet bores and an annular piston centrally receiving the rod in sliding relation. The piston, operating in a pumping chamber, is provided with a passage to the chamber from an opening facing the rod alternately aligning with the discharge or inlet passage. A lost-motion arrangement between piston and rod controls the alternate alignings.

The Boris patent requires precise radial and vertical alignment of rod and piston to make sure the passages in rod and piston align. Further, the pumping volume is limited by the size of the passages.

The Cater U.S. Pat. No. 5,284,276 issued Feb. 8, 1994, discloses a meritorious pump for lotions or the like including a tubular main piston having an outward flange and seal and telescoping within a stepped cylindrical pump body to define a pumping chamber. The piston has a unitary tubular upward axial outlet provided with a valve seat at its lower end. Adjacent and below the valve seat the wall of the piston is apertured. An actuator spout/stem, assembled as a single fixed-together, rigid unit, extends down centrally through the tubular upward outlet and seat. The lower end of the stem is formed with a valve head inside the piston in sealing engagement with the piston wall and adapted to rise to seat on the valve seat.

There is a lost-motion space between the actuator spout/stem and the piston so that, upon depression of the actuator, the stem drops with respect to the piston and the valve head unseats and moves below the aperture in the piston wall before the piston starts to move down. Continuing the same downward stroke, the actuator pressurizes liquid in the pump chamber and forces it out the aperture up through the valve seat and out the actuator spout.

A spring urges the actuator spout/stem up on the return stroke. The stem first raises up inside the piston, again opening the lost-motion space and forcing the head to seat on the valve seat and opening the aperture in the piston wall. As the head engages a shoulder on the piston, the continued upward force of the spring then raises the piston. As the piston raises, it creates a vacuum in the pumping chamber, drawing lotion up through a dip tube at the lower end of the pump body, into the piston and through the piston inlet aperture into the chamber ready for the next downstroke.

SUMMARY OF THE INVENTION

Under the present improvement of the Cater pump, the above-described valve seat is replaced by a second aperture in the piston wall above the aperture described. The stem head is in the form of a peripheral bi-directional fin-type seal which moves from a first position wherein the upper aperture is covered and the lower aperture uncovered to a second position wherein the lower aperture is covered and the upper aperture uncovered.

Advantages accrue. By having both apertures at the same diameter on the wall of the piston, manufacture is simplified and leaks are less likely. The head may have a peripheral seal of a single diameter. The improved arrangement better accommodates dimensional variations and does not require such precise molding. Also, finned-type seals are flexible and are more forgiving of dimensional variations. The clogging of the valve with a vertical beveled seating surface is not a concern.

In addition, the resulting structure permits separate apertures for the pump chamber inlet and discharge flow. Having separate apertures for the opposite flows, into and out of the pumping chamber, makes simpler flow paths and improves the efficiency of the pumping action in this relatively short-stroke application.

In a preferred version the two apertures may be in the form of a single elongated window, the upper portion of which, when exposed, constitutes the discharge and the lower portion, when exposed, constitutes the inlet of the pumping chamber. In the windowed version, the fin-type seals do not encounter the transverse edges of apertures which can cause wear. These two arrangements—the two separate apertures and the elongate window—are regarded as equivalent.

BRIEF DESCRIPTION OF THE DRAWINGS

Further objects and features of the invention will be clear to those skilled in the art from a review of the following specification and drawings, all of which present a non-limiting form of the invention. In the drawings:

FIG. 1 is a sectional centerline view of a pump embodying the invention showing the actuator/stem assembly in the first position with arrows showing the flow in the upstroke mode of the actuator;

FIG. 2 is an enlarged exploded elevation showing the main piston rotated slightly about its axis from the position of FIG. 1 and the stem in section;

DESCRIPTION OF THE PREFERRED EMBODIMENT

Figure 3:
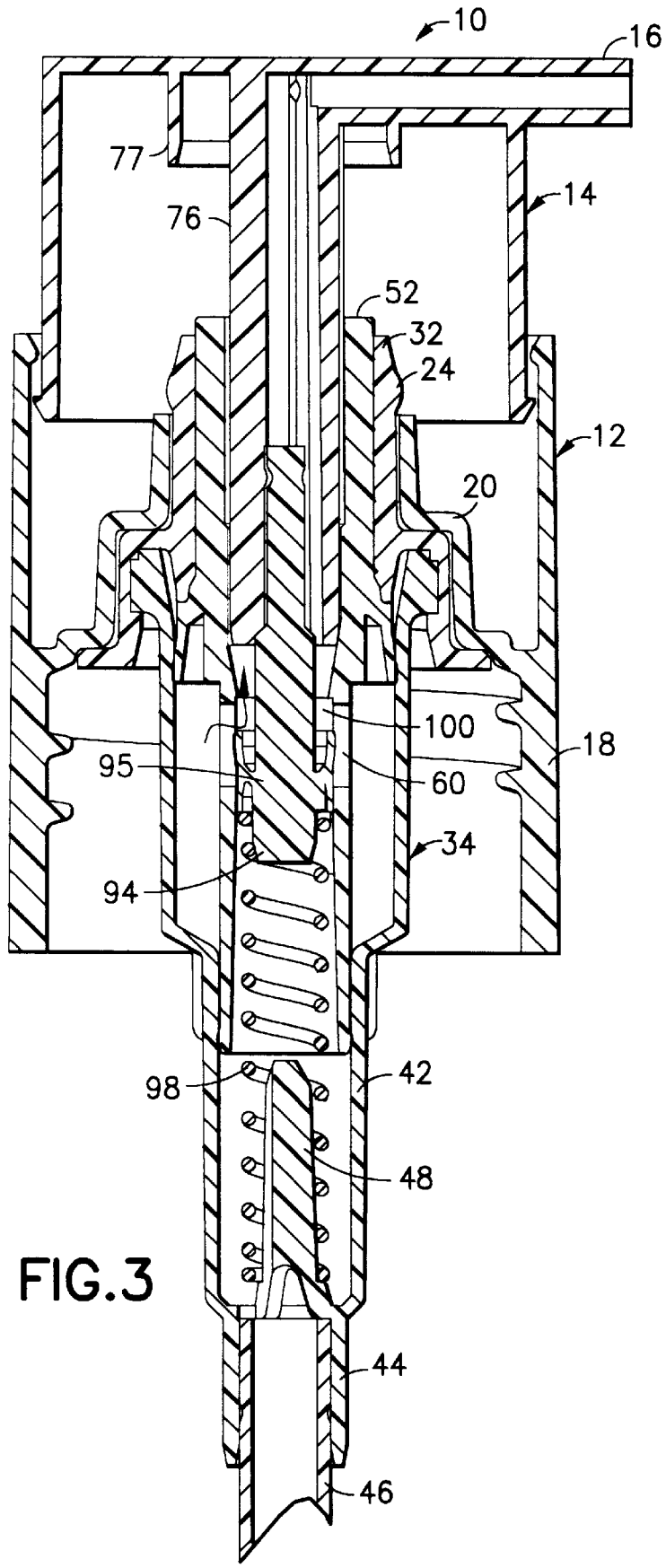
FIG. 3 is a sectional centerline view of the pump of FIG. 1 with the actuator/stem assembly in the second position with arrows showing the flow in the downstroke mode.

A dispensing pump embodying the invention is shown in FIG. 1 and generally designated 10. It comprises a closure 12 and an actuator 14 which telescopes down inside the top of the closure 12 when the actuator 14 is pressed down. The actuator includes the dispensing spout 16.

The closure 12 comprises a generally cylindrical shell 18 having inward therefrom intermediate its ends a stepped annular flange 20. Beneath the merging of the flange with the cylindrical shell 18 the shell is formed internally with threads 22 adapted to screw onto mating threads on the finish of a container (not shown).

An annular retainer 24 fits snugly against the underside of the annular flange 20 and comprises corresponding mating steps which press against the undersurface of the annular flange. At its lower end the retainer comprises a horizontal sealing ring 26 against which the top of the finish abuts, preferably with a liner inbetween (not shown). The retainer further comprises a downward lip 28 and an outward peripheral recess 30 facing the lip 28. The upper end of the annular retainer 24 is formed with a taper 32.

A stepped pump body 34 comprises an upper cylindrical wall 36 having an outward lip 38 which fits into the recess 30 in the retainer. At the lower end of the upper cylindrical wall 36 is an inward annular step 40 to the lower end of which is unitarily connected a lower cylindrical wall 42. At its lower end the lower cylindrical wall 42 is formed with a reduced socket 44 receiving the customary dip tube 46 telescoping fixedly upwardly therein. Inside the cylindrical wall 42 a central spring mount 48 is supported on three radial legs 50 integrally molded with the wall 42 and which permit passage of fluid through ports 51 therebetween.

A main piston 52 is reciprocably disposed inside the retainer 32 and comprises an upper tubular outlet portion 54 which is integral at its lower end with a lower tubular portion 56. At the lower end of the upper portion 54 there steps outwardly the integral piston annular flange and seal 58 which extends downwardly to engage the inside surface of the upper cylindrical wall 36. The distal edge 58a of the piston seal is thinned and sealingly engages against the inside of the upper cylindrical wall.

Spaced below the piston seal 58 the lower tubular portion 56 of the main piston is formed with elongate windows 60. Preferably the windows are spaced uniformly about the wall of the lower tubular portion 56. The lower end of the main piston 52 is formed with an outward sealing rib 62 which engages the inside of the lower cylindrical wall 42 in sealing engagement. A downwardly facing annular stop 63 (FIG. 4) extends inwardly of the piston 52 a short distance above the windows 60.

Thus, the main piston 52 and the body 34 are, in effect, a stepped piston telescoping inside a stepped body. Between them they define a pumping chamber 64. An inlet chamber 66 (FIG. 1) is defined by the lower cylindrical wall 42 and the lower tubular portion 56.

The actuator 14 comprises a top wall 68 and a cylindrical side wall 70. The side wall 70, as shown, is formed with an annular hook 72 at its lower end which, in assembly, is pressed into the inward lip 74 about the upper end of the cylindrical shell 18 of the closure 12 to retain the actuator.

The dispensing spout 16 is an integral molded tube extending radially of the top wall 68 and merging with a downward unitary tubular axial riser 76. The top wall is formed with an abbreviated downward annular ring 77 which meets taper 32 on the retainer. As shown in FIG. 2, the interior of the tubular riser 76 is formed with three evenly spaced inward ribs 78 with spaces 79 inbetween.

The lower end of the tubular riser 76 is formed (FIG. 4) with a downward tapered abutment 80 which preferably corresponds to the angle of the upward tapered abutment 55 of the inside surface of the main piston. As shown in FIG. 1, these tapers are spaced vertically from each other in the first position to constitute a lost-motion relationship.

Figure 4:
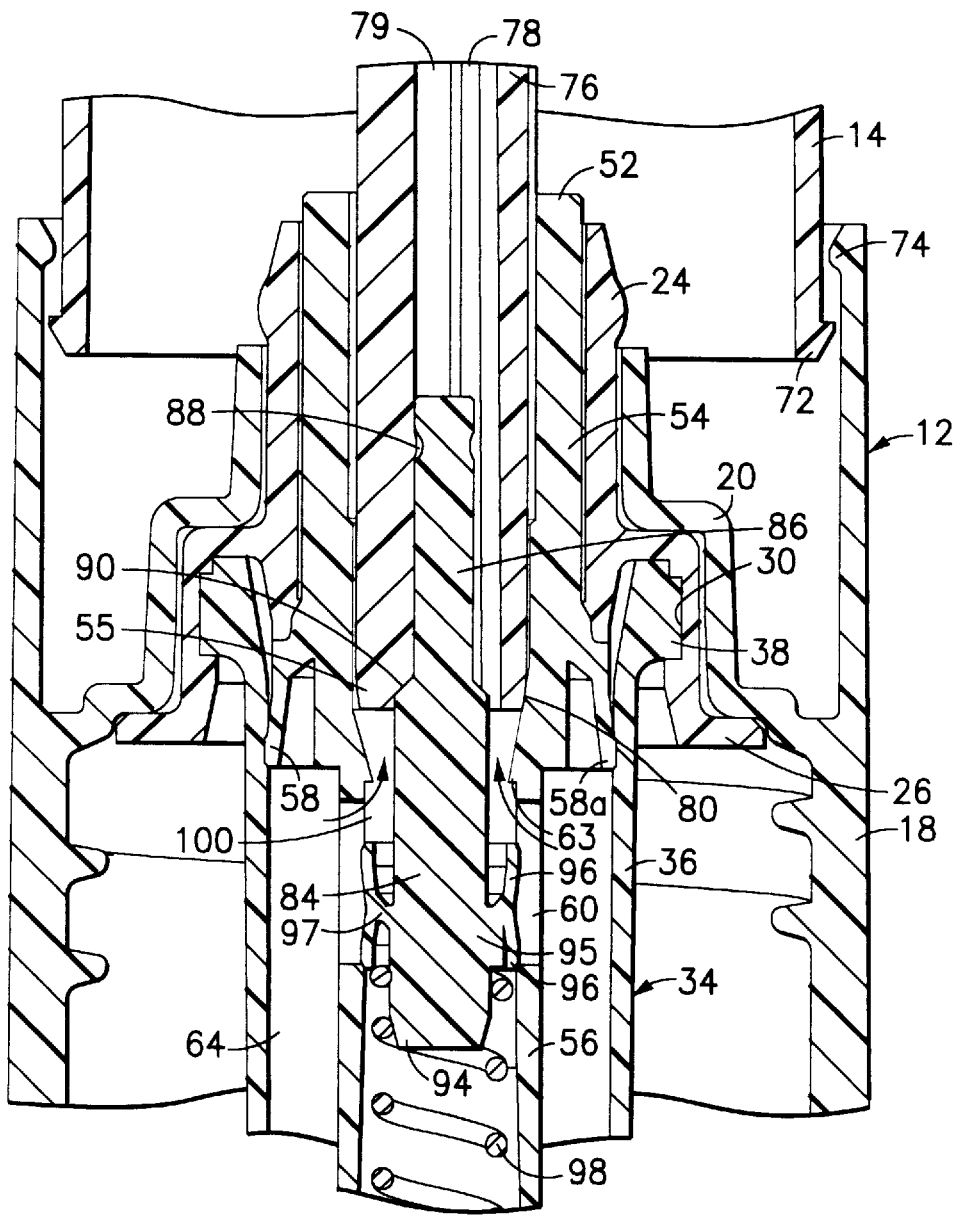
FIG. 4 is a greatly enlarged portion of FIG. 3.

The stem 84 is the valving element of the assembly (FIG. 4). It comprises an elongate upper end 86 which is received within the axial interior of the riser 76 and engages fixedly the ribs 78 and is secured against any movement with respect thereto by means of pronounced detents 88. Intermediate its ends the stem 84 is enlarged outwardly to provide an annular sloping shoulder 90 which butts against a complementing shoulder on the ribs 78 at the lower end of the tubular axial riser, thus assuring that the stem will not collapse into the riser 76 when the actuator is depressed.

Spaced downward from the shoulder 90 and above the lower end 94 of the stem is an outward head 95 having an annular bi-directional fin-type seal 96. This seal is connected by a thin peripheral web 97 to the rest of the stem 84. A spiral spring 98 has its upper end receiving the lower end 94 of the stem and its lower end receiving the central spring mount 48. It is a compression spring in the present environment and serves to urge the stem 84 upward at all times.

The operation of the pump will now be explained. When it is desired to dispense lotion or other liquid from the container (not shown), the actuator 14, normally in the first position axially with respect to the piston shown in FIG. 1, is depressed. In this process the rigidly joined-together actuator 14 and stem 84 together as a unit are manually pressed downward. Prior to any downward movement of the main piston 52, there is a sliding movement of the actuator riser 76 down into the main piston 52 until the downward tapered abutment 80 on the bottom of the riser 76 approaches and engages the upward tapered abutment 55 inside the main piston. In doing so, the lost-motion space between the actuator and the piston, as indicated in FIG. 1, is eliminated for the remainder of the downstroke. This elimination of lost-motion space has the effect of moving the bi-directional fin-type seal 96 downward along the windows 60 of the piston to a second position to open up a discharge aperture 100 above the seal (FIGS. 3,4).

Continued downward movement of the main piston 52 as the actuator is pushed down farther, pressurizes lotion in the pumping chamber 64, causing it to escape upward through the aperture 100 into the space surrounding the stem and then up through spaces 79 between inward ribs 78 and out the spout 16 to define a discharge path.

The lower limit end of travel of the main piston 52 is determined when the lower end 94 of the stem 84 engages the central spring mount 48 and the ring 77 on the actuator 14 engages taper 32.

When or before the piston bottoms out, as described above, the user will release the actuator, permitting the spring 98 to move the actuator spout/stem 84 upward. This raising of the stem 84 causes the bi-directional fin-type seal 96 to move upward with respect to the piston and the elongate windows 60, closing the aperture 100. Simultaneously, a lower aperture 102 (FIG. 1) is opened as the seal 96 exposes it. The seal 96 engages stop 63 (FIG. 4). This reopens the lost-motion spacing (FIG. 1). With the seal 96 driving upward against stop 63, movement continues as the piston 52 rises and expands the pumping chamber 64. Vacuum created thereby draws fluid up the dip tube 46 into inlet chamber 66 and finally through the aperture 102 to define an inlet path and into the pumping chamber 64.

When the main piston flange and seal 58 move up and engage the lower end of the downward lip 28 (FIG. 1), the upward limit of travel is reached. In this first position, with the chamber 64 filled with lotion, the pump is ready for the next depression stroke. If the chamber 64 is empty at the beginning of the process, two or three strokes of the actuator may be necessary to fill it. This is a common characteristic of simple pumps of this type.

In the downward and upward movement of seal 96 with respect to the windows 60, the seal may be regarded as a shuttle valve.

Figure 5:
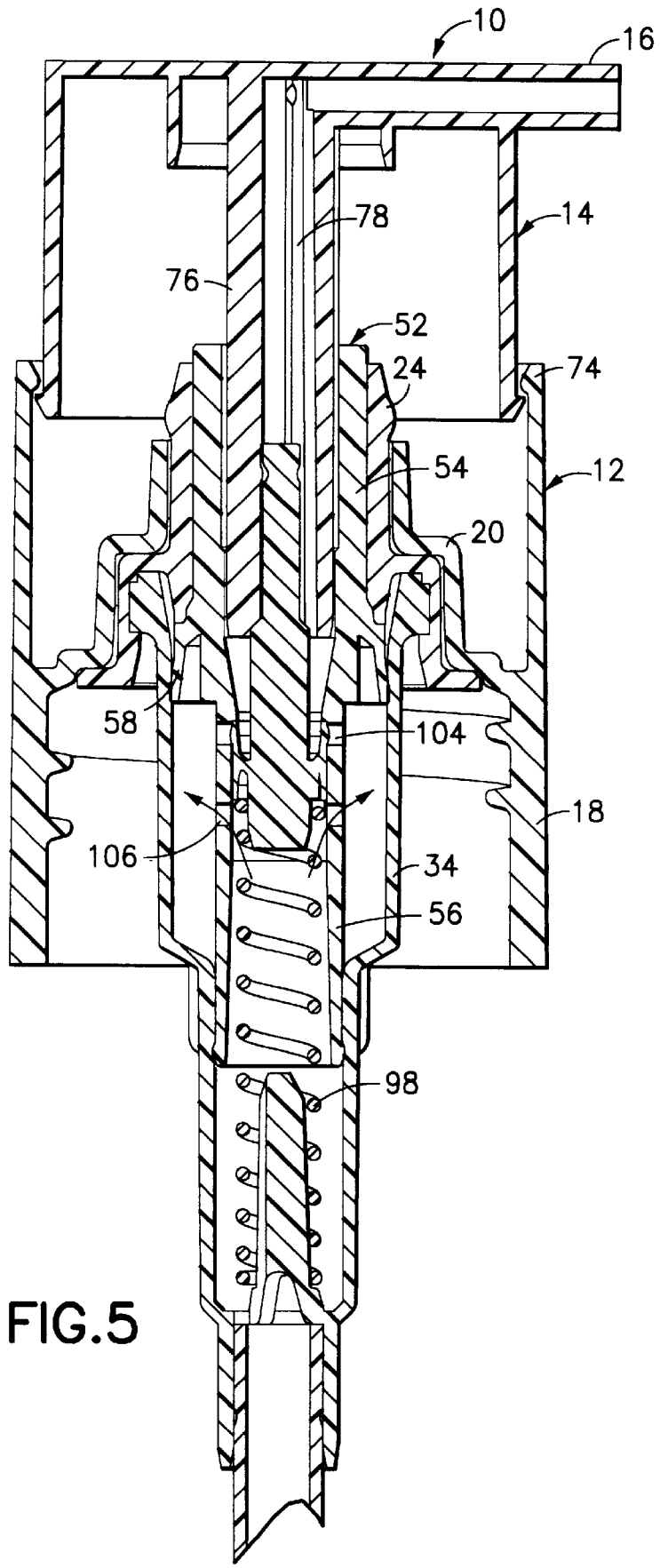
FIG. 5 is a modified form of the pump also embodying the invention. It is, in position of the parts, comparable to FIG. 1.

FIG. 5 shows in first position a modified form of pump in which the windows 60 shown in FIG. 3 are replaced by a discharge set of apertures 104 and an inlet set of apertures 106. The operation of the FIG. 4 embodiment is similar to the operation of the FIG. 1 embodiment except that, instead of the upper portion of the windows 60 being open during the discharge stroke, the discharge set of apertures 104 is open. Similarly, during the inlet stroke, instead of the lower portion of the windows 60 being open, the lower set 106 of apertures 104 is open.

Figure 6:
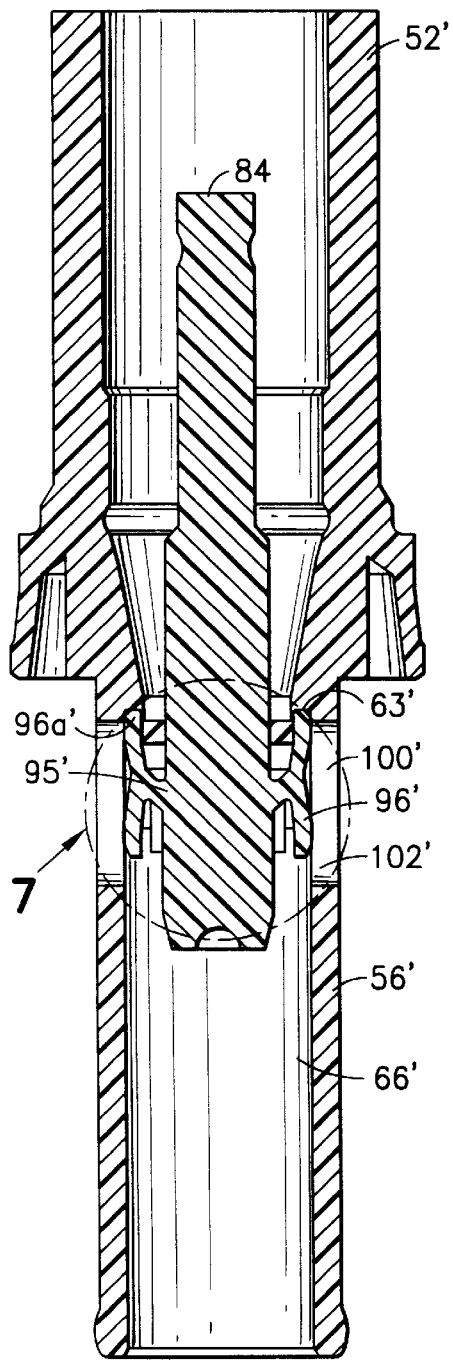
FIG. 6 is a sectional view of a variation of stem and piston in which the primed form of the same numerals are used to designate corresponding parts.
Figure 7:
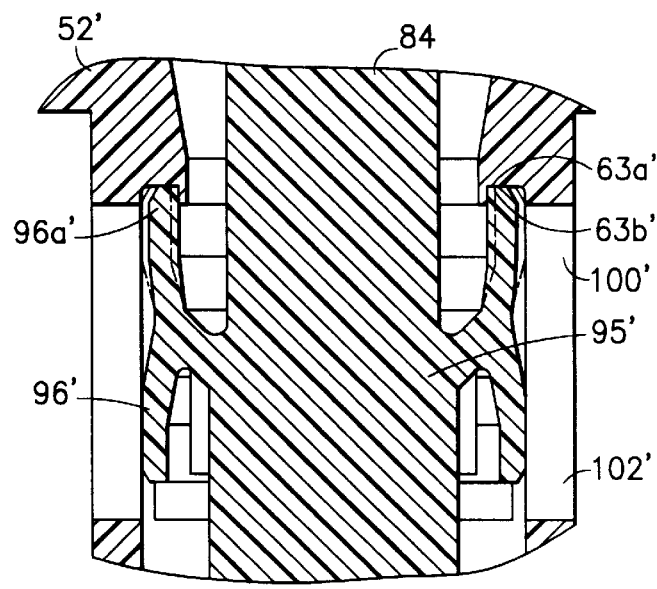
FIG. 7 is a greatly enlarged portion of FIG. 6 as shown with an alternate position of the upward fin seal shown in phantom lines.

In FIGS. 6 & 7, a variation of the FIG. 1 embodiment, the seal 96' in the first position not only covers the outlet aperture 100' (FIG. 3) but also has its distal upper edge 96a' engage the annular stop 63' in a seating relationship (FIG. 6, 7). The annular distal edge engages the horizontal annular seat 63' in a valving off of the discharge path, doubly assuring that the discharge path is closed. As a result, during the upstroke, the pumping chamber, in enlarging, is not susceptible to leaks back from the discharge path through aperture 100' into the chamber 64' and the drawing of liquid up the dip tube and inlet 66 is efficient.

In the FIGS. 6, 7 showings, the stop 63' has a downward annular lip 63a' about its inner edge with an inclining outward frusto-conical surface 63b which serves to center the distal annular edge 96a' of the upward fin of the seal 96 as the stem approaches first position. It also wedges the annular fin edge 96a' outwardly, even further assuring the aperture 100' is blocked.

The upward fin of seal 96' may be made of a diameter slightly less than the inside diameter of the lower portion 56', relying on the outward enlargement of the fin in the manner described to close the fin 96 radially outward over aperture 100 as shown in phantom in FIG. 7. Having the molded outer diameter of the upper fin 96 less than the inner diameter of the lower tubular portion 56' assures that that fin will ride over the upper edge of the aperture 100' without catching.

The embodiments of the invention as disclosed herein simplify the structure of the parts and reduce liklihood of leaks and other malfunctions. Also, in providing separate inlet to and discharge from the pumping chamber, the embodiment improves pumping efficiency.

Further variations in the invention are possible. Thus, while the invention has been shown in only limited embodiments, it is not so limited but is of a scope defined by the following claim language which may be broadened by an extension of the right to exclude others from making, using or selling the invention as is appropriate under the doctrine of equivalents.

What is claimed is:

1. A pump dispenser adapted to be mounted on a container comprising:
   a. a stepped tubular body,
   b. a stepped tubular piston having a wall and telescoping reciprocably inside the stepped tubular body to define a pump chamber, the piston being formed with aperture means in the wall communicating between inside the tubular piston and the pumping chamber,
   c. a stem having an upper portion, and a sealing head disposed in the stepped tubular piston and adapted to occupy a first position closing the aperture means above the head and exposing the aperture means below the head to define an intake path from inside the piston, and a second position closing the aperture means below the head and exposing the aperture means above the head to define a discharge path upward between the upper portion of the stem and the piston,
   d. a spring disposed compressively between the stem and body and urging the stem upward into first position, and
   e. a lost-motion means between the stem and piston whereby downward movement of the stem will first depress the head from first to second position and then move the stem and piston downward in unison inside the tubular body.

2. A pump dispenser as claimed in claim 1 wherein the aperture means comprises an elongate window.

3. A pump dispenser as claimed in claim 1 wherein the aperture means comprises separate inlet and discharge apertures.

4. A pump dispenser as claimed in claim 1 wherein the sealing head comprises a bi-directional fin-type seal.

5. A pump dispenser as claimed in claim 1 including a stop inward in the piston to limit the upward travel of the head to the first position.

6. A pump dispenser as claimed in claim 5 wherein the sealing head comprises a bi-directional fin-type seal defined by an inward annular fin-type seal having an upward distal edge and the stop is annular and the distal edge seats on the annular stop.

7. A pump dispenser as claimed in claim 6 wherein the annular stop has an inner edge and is formed on the inner edge with a downward lip, the lip having a tapered outward surface and as the seal approaches first position, the distal edge is wedged by the tapered outward surface to engage the lower tubular portion and cover the discharge aperture.

8. A pump dispenser comprising:
   a. a stepped cylindrical body having integral upper cylindrical wall and lower cylindrical wall, the diameter of the upper cylindrical wall being larger than the diameter of the lower cylindrical wall, the upper cylindrical wall being stepped inwardly at its lower end communicating with the lower cylindrical wall,
   b. a stepped cylindrical piston telescoping in said body, the piston comprising an upper tubular portion having an upward abutment surface and a connecting lower tubular portion, a piston flange and seal extending outward between the portions and sealingly engaging about the upper cylindrical wall of the body, the lower tubular portion sealingly engaging about the lower cylindrical wall, the stepped cylindrical body and the stepped cylindrical piston defining a pump chamber disposed between the upper cylindrical wall and the lower tubular portion, the lower tubular portion and the lower cylindrical wall defining an inlet path, the lower tubular portion being formed with an upper discharge aperture and a lower inlet aperture and an inward stop above the upper discharge aperture,
   c. a vertical stem disposed centrally of the upper tubular portion of the piston and spaced therefrom to define a vertical discharge path therebetween, the stem having an enlarged head at its lower end which is in slidable sealing engagement about the lower tubular portion of the piston, the stem being adapted to assume a first position at which it covers the discharge aperture and exposes the inlet aperture, and a second position at which it covers the inlet aperture and exposes the discharge aperture,
   d. an actuator secured to the stem and having a spout and a vertical tubular riser portion telescopingly engaging the upper tubular portion of the piston and continuing the discharge path to the spout, the actuator having a downward abutment surface in vertical alignment with the upward abutment surface on the piston, the abutment surfaces being spaced when the stem is in the first position, and
   e. a spring urging the stem upward into engagement with the inward stop on the piston whereat the stem is in first position.

9. A pump dispenser as claimed in claim 8 wherein the discharge aperture and inlet aperture of the lower tubular portion of the piston are enlarged in directions toward each other to constitute an elongate window.

10. A pump dispenser as claimed in claim 8 wherein the sealing head comprises a bi-directional fin-type seal defined by an inward annular fin-type seal having an upward distal edge and the stop is annular and the distal edge seats on the annular stop.

11. A pump dispenser as claimed in claim 10 wherein the annular stop has an inner edge and is formed on the inner edge with a downward lip, the lip having a tapered outward surface and as the seal approaches first position, the distal edge is wedged by the tapered outward surface to engage the lower tubular portion and cover the discharge aperture.

12. In a pump dispenser comprising:
   a. a stepped cylindrical body,
   b. a stepped piston telescoping in said body, the piston having an upper tubular outlet portion having an upward abutment surface and a connecting lower tubular portion having a wall, the stepped cylindrical body and the stepped cylindrical piston defining a pump chamber, the lower tubular portion being formed with an upper discharge aperture and a lower inlet aperture and an inward stop above the upper discharge aperture,
   c. a vertical stem disposed centrally of the upper tubular portion of the piston and spaced therefrom to define a vertical discharge path therebetween, the stem having an enlarged head at its lower end which is in slidable sealing engagement about the lower tubular portion of the piston, the stem being adapted to assume a first position at which it engages the stop and covers the discharge aperture and exposes the inlet aperture, and a second position at which it covers the inlet aperture and exposes the discharge aperture,
   d. an actuator secured to the stem and having a tubular riser riding in the piston and having a downward abutment surface in vertical alignment with the upward abutment surface on the piston, the abutment surfaces being spaced when the stem is at the first position, and
   e. a spring urging the stem upward into engagement with the inward stop on the piston whereat the stem is in first position, the improvement wherein the inlet and the discharge apertures are in the wall of the lower tubular portion of the piston.

13. A pump dispenser as claimed in claim 9 wherein the upper discharge aperture and inlet aperture of the lower tubular portion of the piston are enlarged in directions toward each other to constitute an elongate window.

14. A pump dispenser as claimed in claim 12 wherein the sealing head comprises a bi-directional fin-type seal defined by an inward annular fin-type seal having an upward distal edge and the stop is annular and the distal edge seats on the annular stop.

15. A pump dispenser as claimed in claim 14 wherein the annular stop has an inner edge and is formed on the inner edge with a downward lip, the lip having a tapered outward surface and as the seal approaches first position, the distal edge is wedged by the tapered outward surface to engage the lower tubular portion and cover the discharge aperture.

16. A method of dispensing liquid comprising:
   a. providing a piston having a central tubular-walled extension, the extension being surrounded by an annular pumping chamber, the extension having a uniform inside diameter and having discharge and inlet apertures longitudinally spaced in the wall,
   b. providing a stem having a sealing head sealingly engaging about the wall of the piston, the head adapted to assume a first position relative to the piston in which the sealing head covers the discharge aperture and exposes the inlet aperture and a second position in which the sealing head exposes the discharge aperture and covers the inlet aperture,
   c. reciprocating the piston, and
   d. shuttling the sealing head between first and second positions to cause liquid to intermittingly pass into the inlet opening and out the discharge opening as the piston reciprocates.

\* \* \* \* \*